United States Patent
Pool et al.

[19]

[11] Patent Number: 5,900,195
[45] Date of Patent: * May 4, 1999

[54] PROTECTION OF PIPELINE JOINT CONNECTIONS

[75] Inventors: Paul L. Pool; William H. Gowan, both of Katy, Tex.

[73] Assignee: Urethane Products International, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/694,397

[22] Filed: Aug. 12, 1996

[51] Int. Cl.⁶ .............................. B29C 44/06; B29C 44/12
[52] U.S. Cl. .................... 264/46.5; 156/304.2; 264/46.6; 264/46.9
[58] Field of Search ................ 156/304.2; 264/46.5, 264/46.6, 46.9

[56] References Cited

U.S. PATENT DOCUMENTS

| | | | |
|---|---|---|---|
| 3,289,704 | 12/1966 | Nicosia | 264/46.9 |
| 3,708,982 | 1/1973 | Blockwick | 405/70 |
| 3,807,458 | 4/1974 | Royston | 264/46.9 |
| 3,949,461 | 4/1976 | Thastrup | 285/47 |
| 4,049,480 | 9/1977 | Kutschke | 156/304.2 |
| 4,484,386 | 11/1984 | Stonitsch | 156/304.2 |
| 4,645,557 | 2/1987 | Pedersen | 156/304.2 |
| 4,909,669 | 3/1990 | Baker . | |
| 4,925,605 | 5/1990 | Petronko | 264/46.9 |
| 4,950,345 | 8/1990 | Kreager, Jr. et al. | 156/203 |
| 5,328,648 | 7/1994 | McBrien et al. . | |
| 5,489,405 | 2/1996 | Holbert et al. . | |
| 5,522,674 | 6/1996 | Cooper | 405/63 |

FOREIGN PATENT DOCUMENTS

| | | | |
|---|---|---|---|
| 47-47092 | 11/1972 | Japan | 264/46.9 |
| 53-2904 | 2/1978 | Japan | 264/46.9 |
| 1220349 | 1/1971 | United Kingdom | 264/46.9 |

Primary Examiner—Allan R. Kuhns
Attorney, Agent, or Firm—Pravel, Hewitt & Kimball

[57] ABSTRACT

A method and apparatus for protecting exposed pipeline joints on weight coated pipelines used in offshore applications. The method allows quick installation on a lay barge where pipeline sections are being welded together for offshore installation. The method does not require a long cure time before handling. The method protects the corrosion coating on pipeline joint sections not covered with weight coat by forming a pliable sheet of polyethylene into a cylindrical cover material sleeve over the exposed pipeline joint connection. Polyurethane chemicals are reacted to form a high density foam which fills an annular space between the pipe and the cover material sleeve. The cover material sleeve and the foam form a composite system to protect the joint connection whereby the foam provides continuous compressive reinforcements and impact resistance and the sleeve provides puncture resistance and protection from water jetting/post trenching operations plus abrasion resistance.

20 Claims, 2 Drawing Sheets

PROTECTION OF PIPELINE JOINT CONNECTIONS

BACKGROUND OF THE INVENTION

1. Field of the Invention

This invention relates to pipeline joint protection. More specifically, the invention provides a method and an apparatus for protecting exposed pipe joints on weight coated pipelines used in offshore applications.

2. Description of the Related Art

It has been a common practice in the offshore pipeline industry to use weight coated pipe for pipelines which were to be located on ocean floors or other underwater surfaces. The weight coats traditionally used have been made of dense materials, frequently concrete, applied several inches thick around the circumference of the pipe. The weight coats were to protect the pipeline and also to provide sufficient weight to maintain the pipeline submerged in a non-buoyant condition.

The weight coats usually have been applied to the full length of the pipe except for a short distance, usually about one foot from the end of each pipe section. The end portion of the pipe remained without the weight coat to facilitate welding sections of the weight coated pipe together to make up the pipeline.

Sections of pipe have been placed on a barge and welded sequentially onto preceding sections forming a pipeline extending from the barge. The newly formed pipeline was on rollers and as the barge moved forward, the pipeline would be carried over the rollers, lowered, and laid on the bed of the body of water.

The portions of the pipe without the weight coat had a corrosion coating applied to the surface of the pipe to prevent the pipe from corroding due to exposure to the elements. Generally, the corrosion coatings used were heat shrinking tape or a fusion bonded epoxy. After the sections of pipe were welded together various techniques were used to protect the corrosion coating on the exposed portions of pipe around each joint.

One technique was to wrap sheet metal over the weight coating adjacent the exposed portion of the pipe and band the sheet metal in place with metal bands. Generally, a 26 to 28 gauge zinc coated sheet metal was used. The space between the pipe and sheet metal was then filled with a molten mastic which would solidify as it cooled. However, in most cases, the pipeline had to be in a condition for handling immediately after the sleeves were filled so that the laying of the pipeline could proceed without delays. The mastic filling did not set or harden to a sufficiently strong material within the required time to allow further processing of the pipe and the mastic would leech out into the water if the pipeline was lowered before the mastic was adequately cured.

An additional problem associated with this technique was that the banding used to hold the sheet metal in place, as well as the sheet metal itself, would corrode after the pipejoint was underwater for a period of time. Once the banding corroded, the sharp ends of the sheet metal would come loose from the pipe. This created a particular problem in areas where commercial fishing was taking place. The sharp sheet metal ends would cut fishing nets which were being dragged over the pipeline by fishing trawlers. The destruction of fishing nets by the loose sheet metal created severe financial problems for fishing industries. In some cases, corrosion resistance banding, such as stainless steel banding, was used to avoid this problem, but it was more expensive and also subject to eventual failure.

Other techniques replaced the mastic filler with other types of materials. In the method disclosed in U.S. Pat. No. 5,328,648, the exposed portion of pipe was covered with a mold which was then filled with a filler material. The filler materials were granular or particulate matter such as gravel or iron ore which would not pack solidly or uniformly. Elastomeric polyurethanes or polyureas were then injected into the mold in an attempt to fill the interstices between the granular fill materials. After the polymer components had reacted completely the mold would be removed from the surface of the infill.

This method could be difficult to use when the joint protection system was applied aboard the lay barge because the filler material, often gravel, had to be loaded and carried onto the barge. Additionally, there was often a lack of uniformity in the finished infill resulting from uneven polymer distribution in the filler material which created voids. Such voids could leave the corrosion coating exposed and subject to damage from fishing trawler nets or other objects moving through the water which might encounter the submerged pipeline.

Another technique, disclosed in U.S. Pat. 4,909,669, involved wrapping the exposed portions of pipe with a thermoplastic sheet. The sheet overlapped the ends of the weight coat adjacent the exposed joint and was then secured in place by screws, rivets, or straps. To increase the rigidity and impact resistance this joint protection system required the installation of reinforcing members such as plastic bars or tubes to the interior of the sheet. The reinforcement bars or tubes either had to be precut and stored on the barge or else cut to the required fitting form as part of the installation process on the barge. This required additional handling and made the installation process more difficult.

Another method of reinforcing this joint protection system was to fill the lower portion of the annular space between the pipe and the plastic sheet with a material such as pre-formed foam half shells. When foam half shells were used in the lower portion of the annular space to provide support, the upper portion of the joint and the corrosion coating was in effect protected only by the plastic sheet enclosing the upper portion which had no foam covering. This could cause a particular problem if the pipelines were located where they would encounter the drag lines or trawler boards attached to the nets of fishing trawlers. The corrosion coating on the upper portion of the pipe joint could become damaged by this type of towed object.

An additional problem with this joint protection system occurred when pipelines were laid in shallow waters, i.e., less than about 200 feet deep. Pipelines in shallow waters were often buried by using high pressure water jets which were directed at the ocean floor where the pipelines were to be buried. The water jets would wash out a trench into which the pipelines would be dropped for burial. The joint protection system could be damaged when the water jets came in contact with the pipeline joint because the plastic sheet over the top of the pipejoint was not reinforced.

SUMMARY OF THE INVENTION

The present invention provides a method and an apparatus for mechanically protecting exposed pipeline joint sections. The method allows quick installation on lay barges where pipeline sections are welded together and does not require a long cure time before handling. The method for protecting exposed pipeline joint sections begins by forming a pliable sheet of cover material into a cylinder which is fitted over the exposed portions of the joint connection. The longitudinal end portions of the pliable sheet of cover material overlap the adjacent edges of the weight coating. Side edge portions of the sheet of cover material forming the cylinder are then overlapped tightly such that an annular pocket is formed about the exposed joint section. The outside side edge is then sealed to the surface of the sheet of cover material, completely encasing the exposed pipe and the annular pocket or space. Polyurethane chemicals are then injected into the empty annular space where they react to form a high density foam which fills the annular space. Other polymerizing or hard setting fluid compounds such as marine mastics, quick setting concretes, polymers, or elastomeric compounds may also be used to fill the empty annular space.

The present invention provides the joint section of an underwater pipeline with mechanical protection and abrasion resistance that is not subject to corrosion problems, will not damage fishing nets, and will not be damaged by water jets used for pipeline burial.

BRIEF DESCRIPTION OF THE DRAWINGS

A better understanding of the invention can be obtained when the detail description set forth below is reviewed in conjunction with the accompanying drawings, in which.

DESCRIPTION OF PREFERRED EMBODIMENT

Figure 1:
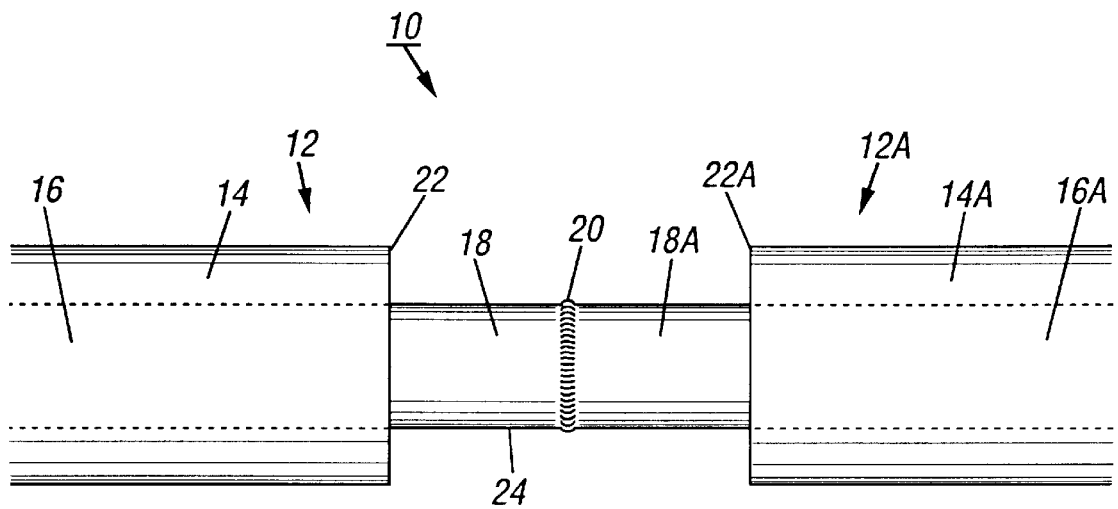
FIG. 1 is a depiction of two sections of weight coated pipe which have been joined by welding.

FIG. 1 shows a pipeline 10 formed by welding together two pipe sections 12 & 12A each of which are covered by a weight coat 14 & 14A, respectively. The weight coat 14 & 14A, which is formed from concrete or other suitable materials, completely covers the pipe sections 16 & 16A circumferentially and longitudinally except for a portion of each pipe end 18 & 18A of the pipe section 16 & 16A. The pipe ends 18 & 18A are left exposed to facilitate welding of the two pipe sections 12 & 12A together as sections of a pipeline. However, these exposed pipe ends 18 & 18A leave gaps of pipe not coated with weight coat in the pipeline 10, which are covered only by a corrosion coating 24.

Figure 2:
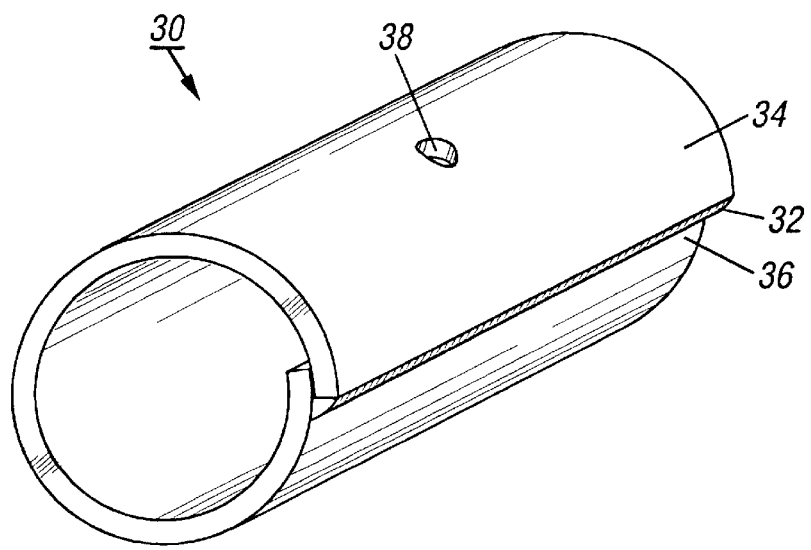
FIG. 2 is a pliable sheet of cover material formed in a cylinder which is used to enclose the exposed joint section.

The method of the present invention begins with installing a cover material 30 which is used to enclose and provide structural protection for the exposed corrosion coating 24 on the pipe end 18 & 18A. As shown in FIG. 2, the preferred method uses a cover material 30 which is pliable, but strong, and can be formed into a cylindrical shape. The preferred cover material 30 is formed from high density polyethylene, however, other thermoplastic materials may be used. The pliable cover material 30 should be at least about 0.02 inches thick and may be considerably thicker if a stronger support and impact resistance is desired. Water depth, pipe size, pipe weight and other factors may dictate the use of a cover material 30 which is up to about ½ inch in thickness. The cover material 30 may be a flat sheet or may be preformed into a cylindrical shape.

The pliable sheet of cover material 30 is wrapped into a cylindrical shape around the exposed pipe ends 18 & 18A such that the inside diameter of the cylinder of cover material 30 is about the same as the outside diameter of the weight coat 14 & 14A on the pipeline 10. The cover material 30 should be long enough to overlap the adjacent edges 22 & 22A of both sides of the weight coating 14 & 14A by several inches to allow the weight coating 14 & 14A to act as a structural support for the cover material 30. Once the cover material 30 is fitted over the adjacent edges 22 & 22A of the weight coat 14 & 14A, the side edges 34 and 36 of cover material 30 are tightly pushed together such that the side edges 34 & 36 overlap. The cover material 30 can be tightened down and held in place with cinch belts. The outside edge 34 is then sealed to the surface of the cover material 30 and a sealed sleeve 40 is formed.

Figure 3:
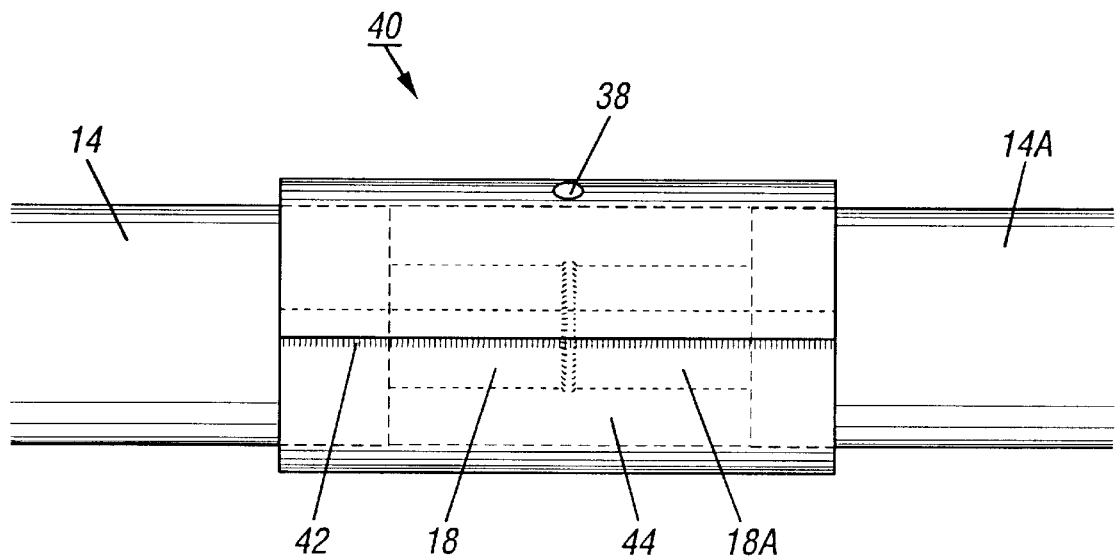
FIG. 3 is a longitudinal view, showing the pliable sheet of cover material wrapped and sealed around the exposed joint section.

The cover material 30 can be sealed by plastic welding the outside edge 34 onto the surface of the cover material 30, forming a longitudinally extending plastic weld the entire length of the cover material 30 as shown in FIG. 3. Other means of sealing such as heat fusion, riveting gluing, taping, or banding can also be used to seal the cover material 30.

The sealed cover material sleeve 40 forms a protective barrier around the exposed portion of pipe 18 & 18A which remains as a permanent part of the pipeline 10. An annular space 44 is formed around the pipe 18 & 18A by installing the cover material sleeve 40. This annular space 44 is filled by first cutting a hole 38 in the sealed cover material sleeve 40 and thereafter injecting fluid joint filler system components through the hole 38 and into the annular space 44.

The hole 38 may be drilled or cut or otherwise made in the sealed cover material sleeve 40 to thereafter allow unreacted joint filler system components to be injected into the annular space 44. The hole 38 may be precut into the cover material 30 prior to installation on the weight coated pipeline 10 or may be cut after the sealed cover material sleeve 40 is in place. The diameter of the hole 38 to be drilled is dependent upon the particular type of mixing head used to inject the joint filler system components. Industry standard or conventional injection heads are acceptable.

In the preferred method, the annular space 44 is filled with a high density foam by injecting components for a rapid setting polyurethane system through the hole 38 with a mixing head. The polyurethane foam 52 serves as a shock absorber and protects the corrosion coating on the pipe 18 & 18A. Also, because the foam 52 is open celled, it can absorb water and increase the ballast effect for the pipeline 10. Alternatively, other polymerizing or hard setting compounds such as marine mastics, quick setting concretes, polymers, or elastomeric compounds may be used to fill the empty annular space. Preferably, any alternative filler material is quick hardening, such that the process of laying the pipeline is not inhibited.

The preferred polyurethane system used to form the protective high density foam 52 in this process is a combination of a isocyanate and a polyol system which when reacted rapidly cures and forms high density open celled polyurethane foam which resists degradation in sea water. The preferred isocyanate is a polymeric form of diphenylmethane diisocyanate as manufactured by Bayer Corp. The preferred polyol system is a mixture of multifunctional polyether and/or polyester polyols, catalysts for controlling the reaction rate, surfactants for enhancing cell formation, and water for a blowing agent. Acceptable blended polyol system are manufactured by Dow Chemical Co., Bayer Corp., and others.

The preferred polyurethane system produces a foam with a density of about 8 to 10 pounds per cubic foot and has about eighty percent or greater open cells. The compressive strength of the preferred polyurethane foam is approximately 150 psi or greater at 10 percent deflection and 1500 psi or greater at 90 percent deflection. Reaction of the preferred polyurethane system components can be characterized by a 15 to 20 second cream time, the time between discharge from the mixing head and the beginning of the foam rise, a 40 to 50 second rise time, the time between discharge from the mixing head and the complete foam rise, and a 180 to 240 second cure time, the time required to develop the polymer strength and dimensional stability.

Figure 4:
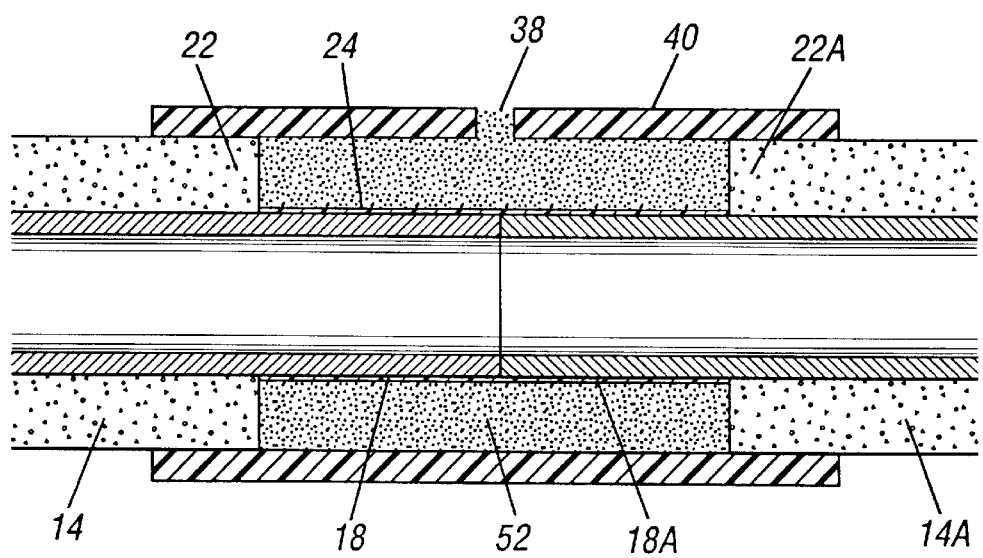
FIG. 4 is a longitudinal cross section showing the joint section after the joint protection system has been applied.

The cover material sleeve 40 acts as a mold and holds the foam 52 in place until it is completely cured. As shown in FIG. 4, this polyurethane foam 52 completely fills the annular space 44 without leaving significant void areas. No additional filler materials are needed to be used in conjunction with the polyurethane foam 52. The polyurethane foam 52 should completely fill the annular space 44 and protrude to some extent upward through the hole 38 on the sealed cover material sleeve 40.

FIG. 4 shows the completed protective covering of the joint protection system according to the present invention. The sealed cover material sleeve 40 together with the polyurethane foam 52 provide a protective system which protects the exposed pipe 18 & 18A and the corrosion coating 24 during handling and laying of the pipeline 10 and continues to provide protection from damage due to drag lines or trawler boards attached to fishing trawler nets. Further, the sealed cover material sleeve 40 is not subject to the corrosion problems of prior art systems and therefore does not create a underwater hazard or a danger to fishing nets. Additionally, the protective system provided by the present invention acts to deflect the high pressure water jets used to bury pipelines in shallow waters which have resulted in damage to the corrosion coating on pipe joints protected by prior art systems.

From the foregoing, it can be seen that the present invention provides a method and apparatus for protecting the corrosion coating 24 on exposed pipeline joints such as 12 & 12A on weight coated pipelines 10 used in offshore applications. The method allows quick installation on a lay barge where pipeline sections are being welded together for offshore installation. The corrosion coating 24 on the pipeline joint connections 18 & 18A which have no weight coating is protected by forming a pliable sheet of polyethylene into a cylindrical cover material sleeve 40 over the pipeline joint connection. Polyurethane chemicals are used to react and form a high density foam 52 which fills the annular space 44 between the pipe 18 & 18A and the cover material sleeve 40. The cover material sleeve 40 and the foam 52 work together to protect the joint connection.

It should be understood that there can be improvements and modifications made of the embodiments of the invention described in detail above without departing from the spirit or scope of the invention as set forth in the accompanying claims.

What is claimed is:

1. A method for protecting exposed joint connection portions of weight coated pipeline being laid from a lay barge beneath a body of water, comprising the steps of:

installing a cover material around the exposed joint connection on the lay barge such that the cover material overlaps the weight coating of the pipeline on either side of the exposed joint connection;

forming an opening into the cover material;

sealing the installed cover material together on the lay barge along side portions of the installed cover material to form an annular void between the pipe and the cover material;

injecting fluid joint filler system components on the lay barge through the opening into the annular void;

allowing the joint filler system to solidify and fill the void; and allowing the joint filler system to absorb moisture and increase ballast of the pipeline.

2. The method of claim 1 wherein the fluid joint filler system is a rapid setting polyurethane system.

3. The method of claim 1 wherein the cover material is a pliable sheet of synthetic resin.

4. The method of claim 3 wherein said step of installing comprises the step of:

forming the resin sheet into a cylinder forming an annular pocket about the exposed joint connection.

5. The method of claim 4 wherein the cover material is sealed by heat welding.

6. The method of claim 4 wherein the cover material is a thermoplastic synthetic resin.

7. The method of claim 4 wherein the cover material is polyethylene.

8. The method of claim 4 wherein the cover material is between about 0.02 inches to about 0.5 inches in thickness.

9. The method of claim 4 wherein the opening is precut into the cover material.

10. The method of claim 4 wherein the joint filler system is a rapid curing polyurethane system which reacts to form a high density open celled foam material in the annular void.

11. A method for protecting exposed joint connection portions on an underwater weight coated pipeline used in offshore applications, comprising the steps of:

installing a synthetic resin cover material around the exposed joint connection on the lay barge by forming the resin cover material into a cylindrical sheet which overlaps the weight coating on either side of the exposed joint connection forming an annular pocket about the exposed joint connection:

sealing the cover material together forming a sleeve;

forming an opening into the cover material;

injecting a mixture of unreacted polyurethane chemicals on the lay barge through the opening into the annular void;

allowing the polyurethane chemicals to react and form an open-celled foam and fill the void; and allowing the open-celled foam to absorb moisture and increase ballast of the pipeline.

12. The method of claim 11 wherein the outside edge of the cover material is sealed to the cover material by heat welding.

13. The method of claim 11 wherein the cover material is a thermoplastic synthetic resin.

14. The method of claim 11 wherein the cover material is polyethylene.

15. The method of claim 11 wherein the cover material is between about 0.02 inches to about 0.5 inches in thickness.

16. The method of claim 11 wherein the opening is precut into the cover material.

17. A method for installing a protection system for exposed joint connection portions of a weight coated underwater pipeline as the pipeline is being laid from a vessel in offshore applications, comprising the steps of:

wrapping a cover material around the exposed joint connection portions such that the cover material overlaps end portions of the weight coating on either side of the exposed joint connection portions and forms a sleeve about the joint connection portions of the pipeline;

forming an opening into the cover materials;

sealing the cover material together along its side portions to form an annular void between the joint connection portions and the sleeve of cover material;

injecting components of a fluid, rapid setting, open cell foam joint filler system through the opening into the annular void;

allowing the joint filler system components to solidify into an open cell foam and fill the void; and allowing the open cell foam to absorb moisture and increase ballast of the pipeline.

18. The method of claim 17 wherein the opening is let open to allow the passage of water into the open celled foam.

19. A method for protecting exposed joint connection portions of a weight coated underwater pipeline as the pipeline is being laid from a vessel comprising the steps of:

wrapping a cover material around the exposed joint connection portions such that the cover material overlaps end portions of the weight coating on either side of the exposed joint connection portions and forms a sleeve about the joint connection portions of the pipeline;

forming an opening into the cover material;

sealing the cover material together along its side portions to form an annular void between the joint connection portions and the sleeve of cover material;

injecting components of a rapid setting, open cell foam joint filler system on the vessel through the opening into the annular void in the cover material;

allowing the joint filler system components to solidify into an open cell foam and fill the void; and allowing the open cell foam to absorb moisture and increase ballast of the pipeline.

20. The method of claim 19, wherein the underwater pipeline is an offshore pipeline.

* * * * *

(12) EX PARTE REEXAMINATION CERTIFICATE (10063rd)

United States Patent
Pool et al.

(10) Number: US 5,900,195 C1
(45) Certificate Issued: Mar. 3, 2014

(54) PROTECTION OF PIPELINE JOINT CONNECTIONS

(75) Inventors: Paul L. Pool, Katy, TX (US); William H. Gowan, Katy, TX (US)

(73) Assignee: Subsea Services International, Inc., Houston, TX (US)

Reexamination Request:
No. 90/010,811, Jan. 6, 2010

Reexamination Certificate for:
Patent No.: 5,900,195
Issued: May 4, 1999
Appl. No.: 08/694,397
Filed: Aug. 12, 1996

(51) Int. Cl.
*B29C 44/02* (2006.01)
*B29C 44/12* (2006.01)
*F16L 1/26* (2006.01)
*F16L 58/18* (2006.01)
*F16L 13/02* (2006.01)

(52) U.S. Cl.
CPC ......... *B29C 44/1242* (2013.01); *B29C 44/1295* (2013.01); *F16L 1/26* (2013.01); *F16L 58/181* (2013.01); *F16L 13/0272* (2013.01)
USPC ...... 264/46.5; 156/304.2; 264/46.6; 264/46.9

(58) Field of Classification Search
USPC ............................................. 425/542; 264/35
See application file for complete search history.

(56) References Cited

To view the complete listing of prior art documents cited during the proceeding for Reexamination Control Number 90/010,811, please refer to the USPTO's public Patent Application Information Retrieval (PAIR) system under the Display References tab.

*Primary Examiner* — Elizabeth McKane

(57) ABSTRACT

A method and apparatus for protecting exposed pipeline joints on weight coated pipelines used in offshore applications. The method allows quick installation on a lay barge where pipeline sections are being welded together for offshore installation. The method does not require a long cure time before handling. The method protects the corrosion coating on pipeline joint sections not covered with weight coat by forming a pliable sheet of polyethylene into a cylindrical cover material sleeve over the exposed pipeline joint connection. Polyurethane chemicals are reacted to form a high density foam which fills an annular space between the pipe and the cover material sleeve. The cover material sleeve and the foam form a composite system to protect the joint connection whereby the foam provides continuous compressive reinforcements and impact resistance and the sleeve provides puncture resistance and protection from water jetting/post trenching operations plus abrasion resistance.

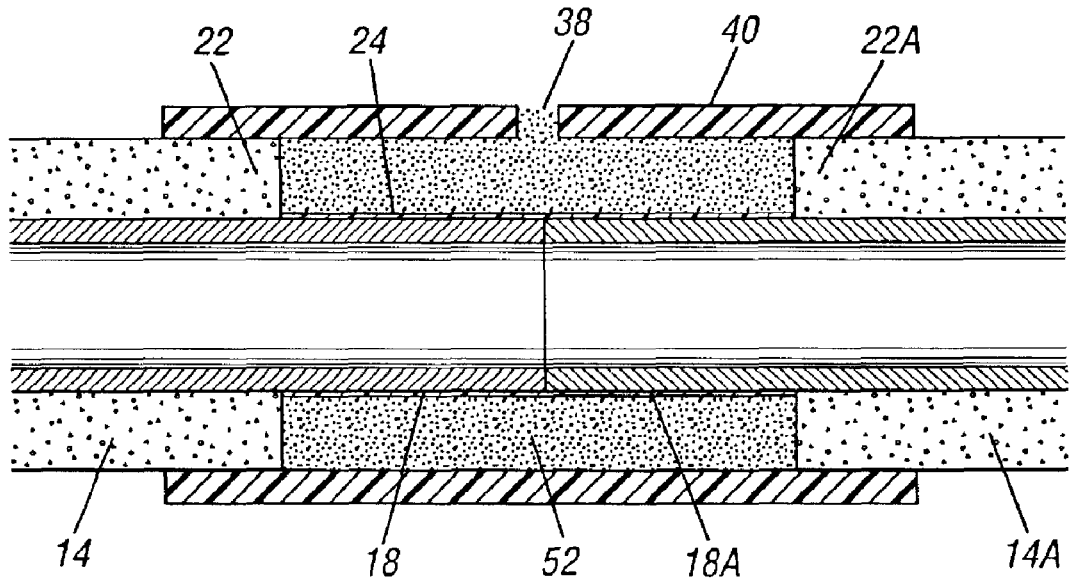

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-20 are cancelled.

\* \* \* \* \*